| United States Patent [19] | [11] Patent Number: 4,887,457 |
| --- | --- |
| Humbarger | [45] Date of Patent: Dec. 19, 1989 |

[54] FIXTURE AND METHOD OF TESTING FOR SOFT PACKAGE LEAK INTEGRITY

[75] Inventor: Grant V. Humbarger, Mishawaka, Ind.

[73] Assignee: Miles Inc., Elkhart, Ind.

[21] Appl. No.: 276,922

[22] Filed: Nov. 28, 1988

[51] Int. Cl.⁴ ............................................. G01M 3/36
[52] U.S. Cl. .................................................... 73/49.3
[58] Field of Search ......................... 73/49.3, 52, 45.4

[56] References Cited

U.S. PATENT DOCUMENTS 3,343,404  9/1967  La Rosa et al. ...................... 73/49.3
3,827,215  9/1974  Massage ............................ 73/49.3 X

FOREIGN PATENT DOCUMENTS 823928   4/1981  U.S.S.R. ............................... 73/49.3
1249859 10/1971  United Kingdom ................. 73/49.3

Primary Examiner—John Chapman
Assistant Examiner—Joseph W. Roskos
Attorney, Agent, or Firm—Roger N. Coe

[57] ABSTRACT

A soft package fabricated of a material with a memory is tested by placing the package in a vacuum. If there are no leaks in the package, the package undergoes a dimensional change as the vacuum is created. This dimensional change can be measured. If no dimensional changes occurs, the package has a gross leak. If the package increases in dimension and then gradually returns to its original shape, a slow leak exists. If the package grows in dimension upon creation of vacuum and retains that dimensional growth, there is no leak in the package. A test fixture for measuring the dimensional changes includes a base plate on which a package may be positioned. A support member is mounted on the base plate to support a plunger rod for reciprocal movement relative to the base plate. The plunger includes a first end that engages the package to be tested and a second end on which a platform is mounted. A counterweight is positioned on the platform. The counterweight is of sufficient weight to overcome the memory force of the package material and return the package to its original dimension.

7 Claims, 1 Drawing Sheet

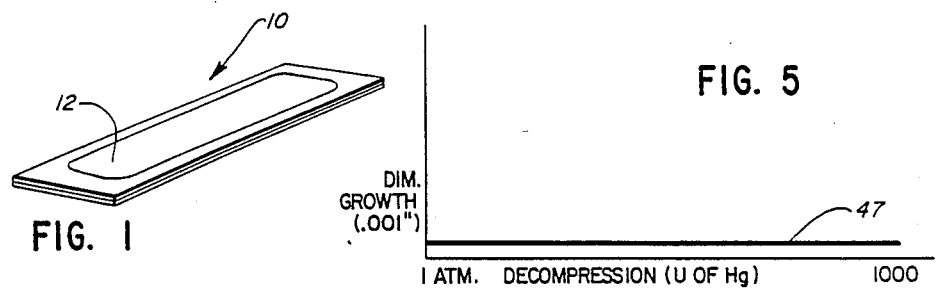
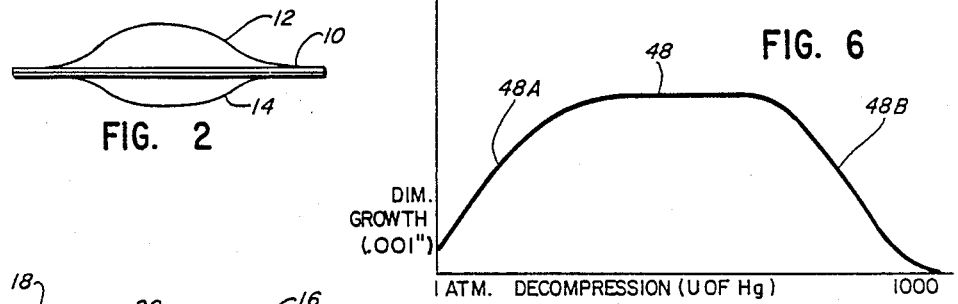
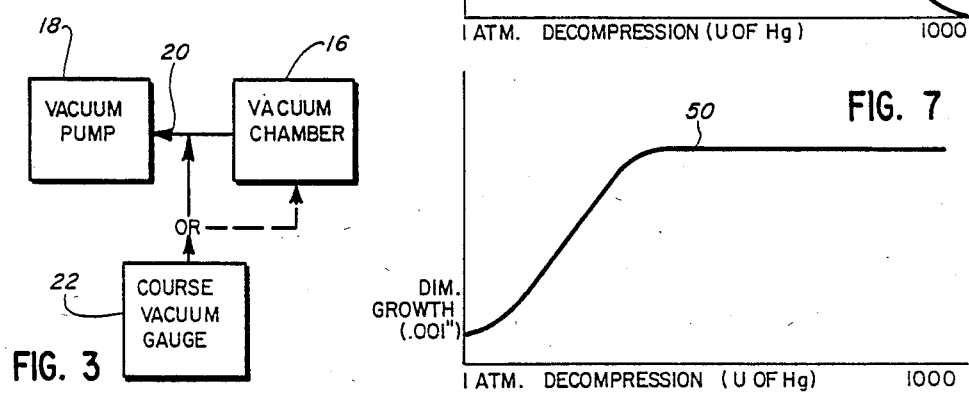
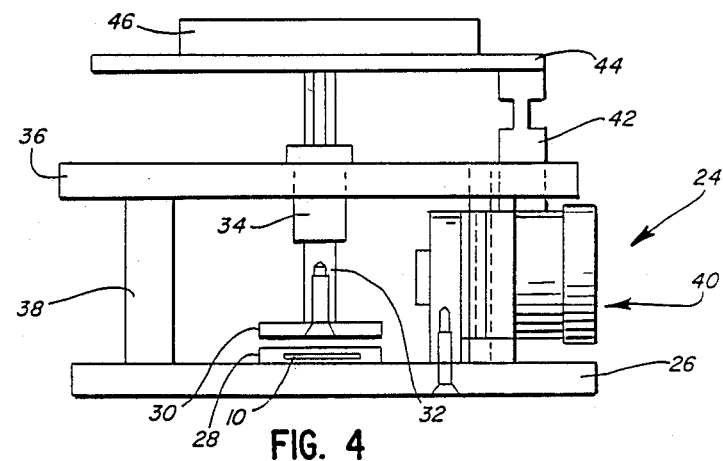

FIXTURE AND METHOD OF TESTING FOR SOFT PACKAGE LEAK INTEGRITY

BACKGROUND OF THE INVENTION

The device of the present invention generally relates to a new and improved fixture for testing soft packages for leak integrity, and to a new and improved method for testing soft packages for leak integrity.

B. Description of the Prior Art

Since some packaged products can be damaged or destroyed by air or moisture, it is important to ensure that the packages enclosing these products have no leaks. An example of a package preferably tested for leak integrity is a foil wrapped package. Efforts have been made to provide a nondestructive methodology for evaluation of packaged products of this type to determine if leaks exist.

One of the early standard procedures for detecting leaks in soft packages is an air leak or a bubble detection procedure conducted under water. This test is a destructive test in that the package is pressurized by a hypodermic needle or similar device inserted into the package, and the package is submerged in water at a known pressure. Bubbles from leaks in the package are counted or captured in a graduated container providing an air/time leak rate. This test is often difficult to conduct since very small holes produce bubbles at a very slow rate, thus increasing the opportunity for error.

Another procedure for determining whether there are leaks in soft packages is trace gas detection using positive pressure. A procedure of this type is provided by Inficon Leybold-Heraues. This procedure involves the introduction under pressure of trace gases into a package to be tested. Leakage of the trace gases is then detected. Such a procedure can result in environmental pollution of the test area, and can lead to frequent incorrect positive test results.

Another trace gas test provides detection in a partial vacuum. In this testing procedure, packages are sealed in a trace gas environment and placed in a partial vacuum. The amount of gas released is monitored to determine whether a leak exists. This test is destructive when the package contents are degraded by the gas and requires sensitive and expensive equipment. Environmental pollution of the test area and the item in the package can also occur possibly resulting in false test responses.

Another known procedure for determining leaks, is a vacuum decay test. In this test, a sample is placed in a first chamber of known volume. Pressure is drawn from the first chamber to a second chamber of known volume. As this is being done, the second chamber is measured for decay in vaccum that would be caused by a leak in the package. Although this procedure is very sensitive, it is difficult to use and can be expensive.

Another destructive test is a test sold by T.M. Electronics, Inc. and Skye Equipment Company, Ltd. These tests involve the insertion of a needle or other device into the soft package, air in the package is then withdrawn and the package is measured for air flow into the package. This destructive test is difficult to use, and the equipment associated with the testing is expensive.

Electronic switches are used in another testing apparatus manufactured by Wilco Precision Testers. In this procedure, packages are placed in a vacuum chamber adjacent a plate with an electric switch or proximity sensor adjacent to each package. Pressure in the vacuum chamber is then decreased creating a vacuum and causing packages without a leak or a slow leak to expand. Once the packages expand a predetermined amount, each of the packages engage a switch or proximity sensor. The engaged sensor provides a signal indicating the package has satisfied the test. This testing equipment will not indicate small or marginal leaks in foil packages, since once a foil package expands, the memory of the package material maintains the package in its expanded configuration despite leakage of air from the package. In this situation, the proximity sensors will signal that no leak exists even though there is a leak in the sample package.

Another testing procedure that uses a vacuum to test for package leaks is a Test-A-Pack system manufactured by the Aro Corporation. This system is intended for larger packages and functions properly only when gross dimensional changes of the packages are to be measured. The system is not adaptable for small packages. The Aro system includes no procedure for detecting small leaks, and like the Wilco system, is not sensitive to a small leak.

SUMMARY OF THE INVENTION

An object of the present invention is to provide a new and improved fixture for testing soft packages for leak integrity.

Another object of the present invention is to provide a new and improved method for testing soft packages for leak integrity.

A still further object of the present invention is to provide a new and improved test fixture and method for testing soft packages for leak integrity wherein the packages are fabricated of material, such as foil, which has a memory.

Briefly, the present invention is directed to a new and improved fixture for testing soft packages for leak integrity, and to a new and improved method for testing soft packages for leak integrity.

The method of testing includes the steps of placing a soft package in a vacuum chamber. A counterweight force is placed on the soft package so that if a slow leak or marginal leak occurs, the memory force of the soft package material will be overcome by the counterweight, thus indicating a marginal leak not detectable by existing systems. A vacuum is then created in the chamber, and dimensional changes in the package are measured over time.

To perform the method of the present invention a new and improved test fixture is provided. The test fixture includes a base plate for mounting the test fixture on a surface such as the floor of a vacuum chamber. A plunger is reciprocally mounted on the fixture to engage a package positioned on the base plate. A counterweight of sufficient weight to overcome the memory force of the material of the package is secured to the plunger. A measuring device for measuring the dimensional changes of the soft package as sensed by the plunger is also mounted on the test fixture and coupled to the plunger.

To conduct a test for leak integrity, a package is placed on the base plate of the test fixture, and the test fixture is positioned in a vacuum chamber. As a vacuum is created in the chamber if there is a gross leak in the package, no dimensional change in the package will occur. This lack of change will be indicated by the measuring device which corresponds to a gross leak in the package.

If a marginal or slow leak exists in the package, as vacuum is created in the chamber, the package will expand and this dimensional change will be indicated by the measuring device. As air slowly leaks from the inside of the package, however, the counterweight overcomes the memory force of the material of the package and the dimension of the package decreases. This decrease will be indicated by the measuring device and interpreted by the user as a marginal leak in the package. Marginal leaks have not been detected by prior art systems since there was no procedure or structure in prior art systems for overcoming the memory force of the package material when a slow leak exists.

If there is no leak in the package being tested by the fixture of the present invention, as vacuum is created, the package will expand and the dimensional change will be recorded by the measuring device. The package will attain an enlarged dimension that will not decrease during testing since there is no leak in the package. This lack of change in the dimension of the package will be indicated by the measuring device and interpreted as a package with no leak.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 1 is a perspective view of a sample package, fabricated of a material such as foil having a memory, that can be tested by the test fixture of and in accordance with the method of the present invention;

FIG. 2 is an end view of the sample package illustrated in FIG. 1 as enlarged or inflated during testing in a no leak or marginal leak situation;

FIG. 3 is a schematic illustration of a vacuum system used with the test fixture and method of the present invention;

FIG. 4 is a front elevation view of a test fixture constructed in accordance with the principles of the present invention;

FIG. 5 is a graphic illustration of a gross leak condition as detected using the method of testing of the present invention;

FIG. 6 is a graphic illustration similar to FIG. 5 illustrating a slow or marginal leak condition as detected using the method of the present invention; and FIG. 7 is a graphic illustration similar to FIGS. 5 and 6 illustrating a no leak condition as detected using the method of the present invention.

DESCRIPTION OF THE PREFERRED EMBODIMENTS

Referring to the drawings and initially to FIG. 1 there is illustrated a soft package generally designated by the reference numeral 10. The soft package 10 is of the type that may be tested by the fixture and method of the present invention.

The soft package 10 is completely sealed and contains an item such as a reagent strip that is sensitive to humidity, moisture and trace gases. The soft package 10 is fabricated from a material such as a foil that has a memory. If the material of package 10 is displaced from the position illustrated in FIG. 1, the material will retain that displaced position due to the memory force of the foil.

In accordance with the principles of the present invention, to test for leak integrity, the soft package 10 is exposed to or placed in a vacuum environment causing dimensional growth similar to ballooning (FIG. 2). As illustrated in FIG. 2, in a vacuum environment pressure surrounding the soft package 10 is substantially reduced below one atmosphere. At the same time, the pressure inside the soft package 10 is at one atmosphere causing the upper side 12 and the lower side 14 of the soft package 10 to expand or experience a dimensional growth similar to ballooning. As this occurs, the soft package 10 assumes the shape illustrated in FIG. 2.

The dimensional growth and the shape of soft package 10 as illustrated in FIG. 2 are an example of a soft package 10 having no leaks or having marginal or slow leaks. In a no leak situation, the package 10 will grow to the enlarged shape illustrated in FIG. 2, and will maintain that shape due to the greater pressure within the soft package 10 relative to the surrounding vacuum.

If there are marginal or slow leaks in the package 10, in a vacuum the soft package 10 will initially grow to the dimensions illustrated in FIG. 2. As air or other gas within the package 10 slowly leaks through the small holes or leaks in package 10, the pressure in the package 10 attains the pressure of the surrounding vacuum. Since the foil or other material of the soft package 10 has a memory, however, the package 10 will maintain the configuration illustrated in FIG. 2 despite the slow leak.

It is the slow or marginal leak condition that has resulted in incorrect readings by prior art non-destructive test fixtures. More specifically, the typical prior art non-destructive test fixture will indicate that there is no leak if the soft package expands to the dimensions illustrated in FIG. 2. The prior art non-destructive test fixtures typically do not include structure or other means that can determine that there is a slow or marginal leak, since there is no means for compensating for the memory of the material which allows the package to maintain the configuration of FIG. 2 even after the pressure in the soft package 10 has dropped to the level of the vacuum pressure.

Even though some destructive testing procedures such as inflating the package will detect marginal leaks, these procedures are unreliable and inaccurate. For example, those destructive test procedures that inflate the soft package 10, place the inflated package under water and bubble are counted. This test does not provide an easy, reliable procedure for detecting the small and infrequent bubbles from a marginal leak. Since detection is difficult, the results of this procedure are often inaccurate.

The procedure for testing soft packages 10 in accordance with the principles of the present invention is schematically illustrated in FIG. 3. As illustrated in FIG. 3, the test procedure of the present invention includes a vacuum chamber 16. The vacuum chamber 16 may be any air tight enclosed chamber, and it is into this chamber 16 that the soft packages 10 to be tested are placed. The vacuum chamber 16 is at atmospheric pressure prior to the commencement of the test, and upon commencement of the test, air is removed from the vacuum chamber 16 by a vacuum pump 18. The pump 18 is connected to the vacuum chamber 16 by a conduit or similar connection 20. It is desirable during the test procedure of the present invention to create a vacuum in the vacuum chamber 16 of approximately 900 u. To determine the vacuum level in the chamber 16, a vacuum gauge 22 is coupled to the vacuum chamber 16 or the conduit 20. This allows the operator to determine whether the proper test procedures are being followed.

To measure the dimensional growth or lack of growth of the soft packages 10 during a test, and to distinguish between a no leak situation and a slow or marginal leak situation, a test fixture generally designated by the reference numeral 24 is used (FIG. 4). The test fixture 24 is positioned in the vacuum chamber 16 and a soft package 10 is mounted on a base 26 of the test fixture 24. A soft package 10 is positioned within a package guide 28 on the base 26. The guide 28 aligns and positions a soft package 10 to be tested directly below a foot 30. The foot 30 is secured to a plunger rod 32. The plunger rod 32 is mounted to reciprocate in a bushing 34 mounted in and extending through an upper support 36. The support 36 is spaced above the base plate 26 and is rigidly maintained in this position by columns 38.

The foot 30 is positioned by the rod 32 and support 36 relative to the soft package 10 such that as dimensional changes or enlargement occurs in the soft package 10, the soft package 10 engages the foot 30 causing movement of the plunger rod 32 through the bushing 34. It is possible to measure the movement of the plunger rod 32 to determine the dimensional changes in the soft package 10.

The movement of the plunger rod 32 is indicated by a dial indicator generally designated by the reference numeral 40. The dial indicator 40 or electronic sensor is mounted on the base plate 26, and includes a plunger 42 that is connected at its upper end to a platform 44. The platform 44 is secured to the upper end of the plunger rod 32 and moves with the plunger rod 32 as the dimensions of the soft package 10 change. The platform 44 functions to couple mechanically the plunger rod 32, the plunger 42 and the dial indicator 40.

In addition, the platform 44 also provides a mounting surface for a counterweight 46. The counterweight 46 is of a preselected weight sufficient to overcome the memory force of the material of the soft package 10, but not too heavy to inhibit movement of the plunger rod 32 in response to dimensional growth of the soft package 10.

In accordance with the principles of the present invention, the test fixture 24 will sense and indicate dimensional changes of the soft package 10. More specifically, once a soft package 10 is mounted within the guide 28 below the foot 30, and the test fixture 24 is positioned within the vacuum chamber 16, the vacuum pump 18 is energized to draw air from the chamber 16 and create a vacuum. As this occurs, the soft package 10 will either remain in the configuration illustrated in FIG. 1 as when a gross leak exists in the package 10, or a dimensional growth will occur.

If there are no leaks in the soft package 10, the soft package 10 under the influence of the vacuum, will undergo a dimensional growth reaching a configuration similar to the configuration illustrated in FIG. 2. As this occurs, the upper side 12 of the soft package 10 will engage the foot 30 causing the plunger rod 32 to move upward through the bushing 34. The plunger 42 of the dial indicator 40 will also move and the dial indicator 40 will indicate the magnitude of the dimensional growth of the soft package 10.

Once an atmosphere of about 900 u (microns) is reached, that vacuum level is maintained and the dial indicator 40 is monitored for any changes in the size of the soft package 10. If no changes occur, this indicates that no leaks exist in the soft package 10. If there is a slow leak in the soft package 10, however, the counterweight 46 will gradually overcome the memory force of the material in the soft package 10 causing a reduction in the dimensional size of the soft package 10. This reduction in dimensional size will be indicated on the dial indicator 40 signaling a slow or marginal leak in the package 10.

The situations of a gross leak, a slow or marginal leak and a no leak are grapically illustrated in FIGS. 5-7. With specific regard to FIG. 5, this graph illustrates a gross leak situation. The line 47 corresponds to the data read from the dial indicator 40. As a vacuum is created in the chamber 16, the air within the package 10 rapidly leaks from the package 10 such that no dimensional growth occur in the soft package 10 and no dimensional growth is indicated by the dial indicator 40. Consequently, the straight horizontal line 47 is plotted.

In a slow or marginal leak situation, as a vacuum is created in the vacuum chamber 16, a dimensional growth of the soft package 10 does occur as indicated by the line 48A in FIG. 6. Once 900 u is reached line 48 indicate the dimensional growth achieved. For a predetermined period thereafter the indicator 40 is monitored. During this period air slowly leaks out of the soft package 10. Although the soft package 10 upon 900 u being reached initially maintains the dimensional growth configuration illustrated in FIG. 2 and by line 48, air continues to leak out of the package 10 and the counterweight 46 overcomes the memory force of the material of the soft package 10. A reduction in growth is then indicated by the dial indicator 40. This reduction in size is illustrated by the line 48B in FIG. 6.

This sensing or measuring the reduction in size of the soft package 10 has not been achieved in the prior art. As a result, the slow or marginal leak situation is not recorded by prior art test fixtures. The test fixture 24 in the present invention, however, through the use of the counterweight 46, senses slow or marginal leak conditions.

If the soft package 10 includes no leaks, the line 50, as illustrated in FIG. 7, will be followed. More specifically, as a vacuum is created in chamber 16, the package 10 undergoes dimensional growth to the configuration illustrated in FIG. 2. Upon reaching approximately 900 u, the vacuum level is maintained and the dial indicator 40 and the package 10 are carefully watched to determine whether there is any reduction in the dimensions or size of the package 10. No reduction in the dimensions will be indicated as illustrated in the straight horizontal portion of line 50 since no leaks exist.

The test fixture and the method of testing in accordance with the principles of the present invention allow the user to test for gross leak situations, no leak situations, and allows accurate determination of a slow or marginal leak situation previously unavailable in prior art test fixtures and methods of testing. This determination of a slow or marginal leak situation is possible through the use of the counterweight 46 in the test fixture 24.

What is claimed is:

1. A method of testing for leaks in soft packages fabricated, at least in part, of a material having memory comprising the steps of:

placing one or more soft packages in a chamber;

placing a counterweight force on said soft packages tending to hold said soft packages in their original configuration;

creating a vacuum of approximately 900 u in said chamber; and measuring any dimensional changes of said soft packages.

2. The method of testing soft packages claimed in claim 1 further comprising the step of rejecting any said soft packages if there are no dimensional changes during said testing.

3. The method of testing soft packages claimed in claim 1 further comprising the step of rejecting any said soft packages if there is any dimensional increase of any of said soft packages followed by a decreasing package dimension.

4. The method of testing soft packages claimed in claim 1 further comprising the step of accepting said soft packages if after reaching a vacuum of approximately 900 u, there is no change or an increase in the dimensions of the soft packages for a predetermined period of time.

5. A test fixture for testing soft packages for leak integrity, comprising:

a base member for supporting said test fixture and one or more soft packages to be tested;.

a platform spaced from said base member for supporting a counterweight of a predetermined weight;

a plunger on said platform for contacting said soft packages and mechanically interconnecting said platform and said soft packages;

a counterweight on said platform, said counterweight being of sufficient weight to collapse a soft package if a leak exists; and a support member secured to and above said base member for supporting said plunger to allow said platform to move relative to said support member and said base member in response to dimensional changes in said soft packages.

6. The test fixture for testing soft packages for leak integrity set forth in claim 5 further comprising a measuring assembly secured to said test fixture for measuring the movement of said platform during testing to indicate dimensional changes of said soft packages.

7. The test fixture for testing soft packages for leak integrity set forth in claim 5 further comprising guides on said base member for guiding said soft packages into position on said base member.

* * * * *